March 11, 1958 U. VÖLKER 2,826,214
PRESSURE REGULATORS FOR GAS METERS
Filed March 13, 1952 2 Sheets-Sheet 1
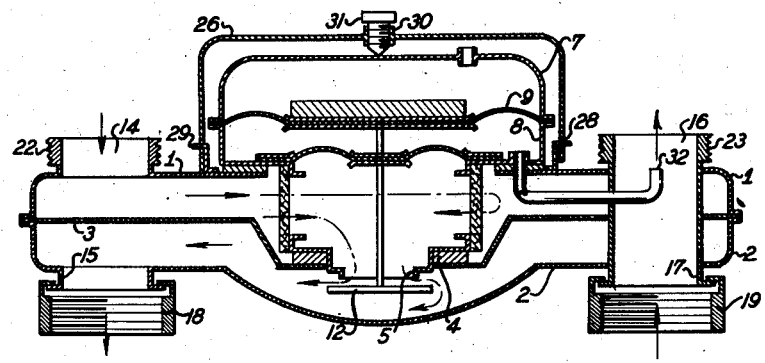
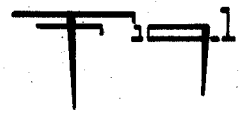
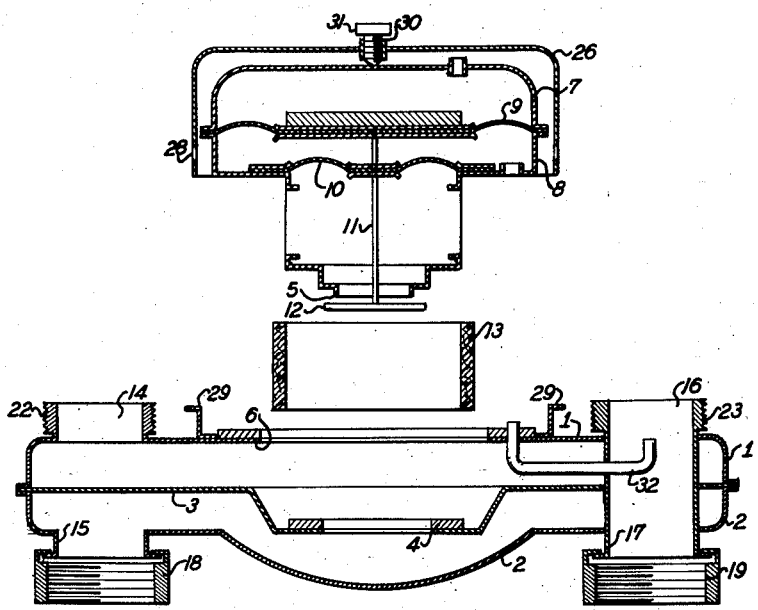
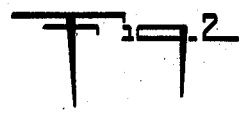
INVENTOR
ULRICH VOLKER
BY
ATTORNEYS

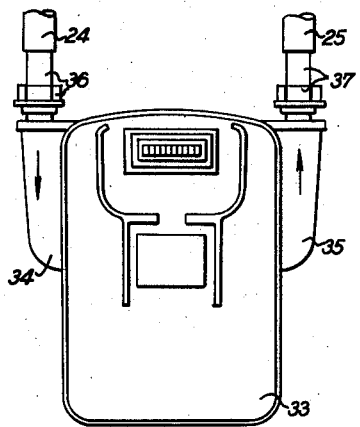
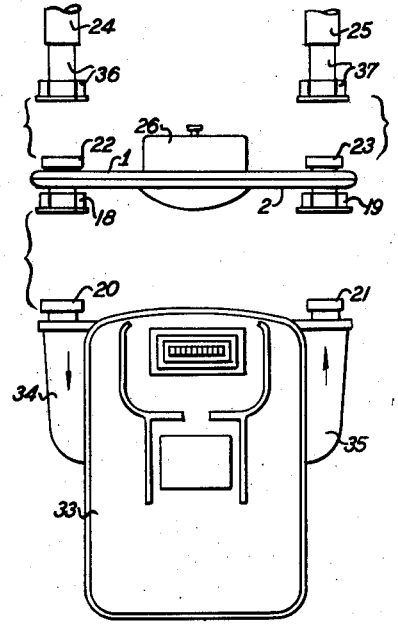
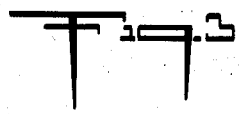
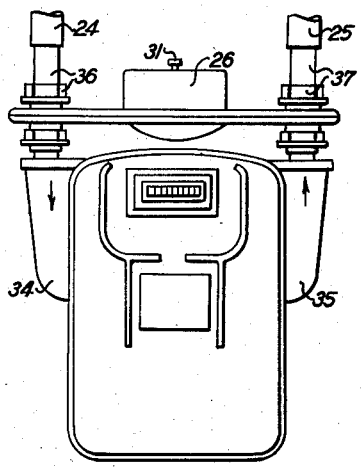
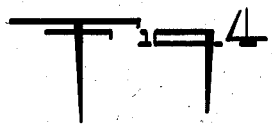
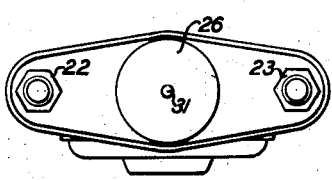
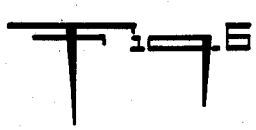
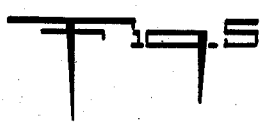
INVENTOR
ULRICH VOLKER

United States Patent Office 2,826,214
Patented Mar. 11, 1958

2,826,214

PRESSURE REGULATORS FOR GAS METERS

Ulrich Völker, Mainz, Germany, assignor to Elster & Co. A. G., Mainz-Kastel, Germany, a corporation of Germany Application March 13, 1952, Serial No. 276,332

3 Claims. (Cl. 137—454.6)

This invention relates to improvements in pressure regulators for gas meters. It more particularly relates to a fitting reinforcing member formed as a valve housing for pressure regulators for gas meters.

Pressure regulators are used in connection with gas meters for controlling the pressure of the gas flowing therethrough. These regulators have been developed in such a manner that they serve as bars and reinforcements between the side pipes or the coupling nipples of the meter, making it possible to dispense with special connecting devices, meter bars or the like otherwise necessary for this purpose.

The gas meters generally have a gas inlet opening and a gas outlet opening positioned on opposite sides of the top. In one known embodiment in which the regulator acts as a connecting device and reinforcement between the coupling nipples on the inlet and outlet side of the meter, the regulator housing consists of a one-piece casting with two lateral extensions. One of these extensions holds the regulator valve as well as the inlet and the outlet holes of the regulator, and serves as the fitting connection of the gas supply pipe to the inlet of the meter. The other extension of the cast body is merely formed as a cylindrical ring which encircles a short fitting pipe which is connected to the meter outlet. This annular ring rests on a nut positioned on the threaded portion of this short pipe which serves as an adjustable rest. The cylindrical ring on the one side and the inlet and outlet holes of the regulator on the other side are positioned apart the same axial distance as the inlet and outlet terminals of the meter.

In assembly with the meter, the threaded ends of the coupling nipples (forming upper part of the meter screw joints) are screwed one into the outlet hole of the regulator, and the other into the lower end of a little short fitting pipe passing through the ring-shaped extension of the regulator cast body.

In this known embodiment the regulator must be disadvantageously positioned high above the meter housing which, due to the structural height of the regulator itself, still further increases the height of the entire arrangement. The ungainliness of the regulator meter combination and its unproportionality are further emphasized by this.

In addition in this known embodiment of the meter bar regulator, the regulator valve is controlled solely by the gas entering the inlet side of the gas meter, and it is not possible to very advantageously use the rear pressure from the outlet side of the gas meter to control the regulator valve in the known manner.

One object of this invention is a housing for a meter regulator which will act as a fitting and reinforcement for the attachment of the gas supply and service pipes to the meter without the above-mentioned difficulties. This and still further objects will become apparent from the following description read in conjunction with the drawings in which:

Fig. 1 shows a vertical section of the meter regulator and the housing in accordance with the invention;

Fig. 2 shows an exploded view of the vertical section of the regulator housing shown in Fig. 1;

Fig. 3 shows a front elevation of the gas meter without a regulator attached and with the gas pipes attached;

Fig. 4 shows a gas meter shown in Fig. 3 with the gas pipes detached and the regulator and housing in position to be attached between the pipes and the meter;

Fig. 5 shows the meter regulator housing as shown in Fig. 4 completely attached; and Fig. 6 shows a top elevation of the meter, the regulator and the regulator housing as shown in Fig. 5.

In accordance with the invention, the housing for the meter regulator acts as fittings for connecting the gas pipes to the inlet and outlet terminals of the gas meter and acts as a bar reinforcement therebetween. The meter regulator housing is formed as a flat elongated container. There are fittings positioned at each end of this flat, elongated container, which are spaced apart the same axial distance as the gas pipes and the inlet and outlet terminals of the gas meter. One of these fittings, which will be referred to hereinafter as the housing inlet fitting, is positioned for the attachment of the gas supply to one side and the meter inlet terminal to the other side. The other fitting, which will be referred to hereinafter as the housing outlet fitting, is positioned for attachment of the meter outlet terminal to one side thereof and the gas service pipe to the other side thereof. The housing, which is in the form of a flat container, has a partition wall which divides it into an upper and lower portion. This partition wall extends through the housing inlet fitting, dividing the same into an upper and lower portion, but the housing outlet fitting extends through the partition. The top of the flat container-like housing has an opening therethrough for the insertion of the meter regulator. The partition wall also has an opening, so that when the meter regulator is positioned in the housing, the meter regulator valve will be so positioned that it may vary the opening or gas passage through the partition wall. Thus, when the housing with the regulator is positioned on the gas meter, the gas entering the housing inlet fitting at the upper side will pass to the upper side of the flat container-like housing and can only pass through to the lower side of the housing through the opening in the partition wall, which is variably adjustable by the regulator valve. When the gas passes through this valve to the lower side of the housing, it passes out of the lower part of the housing inlet fitting into and through the meter. The gas, as it passes out of the outlet opening of the meter, will pass directly through the housing outlet fitting. A connection may be inserted in the housing outlet fitting to the regulator for regulating the valve by means of the pressure in the housing outlet fitting.

By means of the meter regulator and housing therefor in accordance with the invention, it is possible to attach the meter regulator to the meter in the same manner as any other "meter bar" or fitting, and to connect the same together as a structurally integral unit. This overcomes the disadvantage of the conventional meter bar regulators which are attached and appear as independent and ungainly additions to the meter rather than as a part of the meter construction itself. Furthermore, in accordance with the invention, it is possible to connect the space below the control diaphragm of the regulator valve to the meter output side of the gas line, so that the control pressure for the regulator valve is taken from this point. This connetcion may be made in a simple and invisible manner, which is completely protected from the outside.

In addition, in accordance with the invention, the meter regulator itself may be constructed as a replaceable insert for insertion in the regulator housing. Thus it is possible, as, for example, when passing from low pressure to medium pressure (i. e., from 100 mm. water to 2,000 mm. water) to merely remove the regulator insert and insert a different regulator insert of a different pressure range. This may be done without having to disconnect the gas line or the meter in any manner with the regulator housing unit remaining in the line completely unchanged. This is a considerable advantage over coventionally known meter bar regulators in which it is necessary to remove the entire regulator along with the gas meter from the line when passing from one pressure range to another.

The invention will be explained in further detail with reference to the accompanying drawings, which are given solely for the purposes of illustration and not limitation.

With reference to Figs. 1 and 2, the pressure regulator valve housing is in the form of a flat container consisting of two flat shells 1 and 2, having a separating partition wall 3 therebetween. An opening 4 is defined through the partition wall 3. This opening 4 carries the valve seat 5. An opening 6, defined through the upper housing shell 1, serves for the introduction of the lower part of a meter regulator insert. The meter regulator insert as shown has the diaphragm casing 7 and 8 with the operating diaphragm 9. A relief diaphragm 10 is positioned below the operating diaphragm 9. The valve stem 11 with the valve or throttling member 12 is connected for movement with the operating diaphragm 9. A dust filter 13 is fastened to the lower casing 8. The entire regulator insert, consisting of these parts, is assembled into a structural unit which may be easily removed, inserted or exchanged from the rest of the regulator valve housing. It will, of course, become obvious to those skilled in the art to adapt many of the known meter regulators as inserts for use in the regulator valve housing as disclosed. The structure of this insert is not, however, intended as the subject matter of the present invention.

The housing inlet fitting consists of the inlet terminal 14 and the outlet terminal 15 arranged vertically one above the other on one side of the housing. The housing outlet fitting, having an upper pipe terminal 16 and a lower pipe terminal 17, is positioned on the other side of the housing at an axial distance away from the housing inlet fitting, which corresponds to the standard center-to-center distance of the corresponding gas meter pipe connections. The housing outlet fitting extends through the upper shell 1, the lower shell 2 and the partition wall 3, forming a gas-tight conduit which will be a part of the meter outlet line (service line) when the housing is attached to the meter. The partition wall 3 extends through the housing inlet fitting and forms a gas-tight partition between the inlet terminal 14 of the housing inlet fitting and the outlet terminal 15 of the housing inlet fitting.

The lower shell 2 of the housing and the partition wall 3 are arched downward in the center in a counter-sunk manner so that when the regulator insert is positioned in the housing, only the diaphragm casings 7 and 8, as well as a safety hood 26, extends above the regulator valve housing. A wedge-shaped recess 28 is provided around the safety hood 26, which, together with a corresponding cooperating member 29 on the shell 1, forms a bayonet-type closure. The safety hood 26 has a threaded bore 30 with a check bolt 31 screwed therein. By tightening the check bolt 31, the regulator insert is forced down against the housing shell 1, and a seal therebetween is assured. The tightening of this bolt will also assure a firm connection of the bayonet closure 28, 29. Annular gaskets may be positioned around the openings 6 and 4 in the upper housing shell 1 and the partition wall 3 respectively. The gasket around the opening 6 through the upper shell 1 will insure a good fitting and tight connection between the wall 1 and the lower portion of the diaphragm casing 8. The gasket around the opening 4 in the partition wall 3 will assure a sealing and good fitting between the partition wall 3 and the lower portion of the regulator insert which defines the valve seat 5 for the valve or throttling member 12.

A small pipe 32 connects the space below the operating diaphragm 9 with the conduit defined by the housing outlet fitting. This pipe is positioned within the housing, and it is thus completely protected from the outside. The pressure in the housing outlet fitting, which, when connected with the meter, will form a part of the meter outlet gas line (service pipe), will be communicated through the pipe 32 to the space below the operating diaphragm 9 and thus control the diaphragm 9 which through the valve stem 11 will control the position of the valve or throttling means 12 in relation to the valve seat 5.

The connection of the meter bar regulator in accordance with the invention to the meter is shown in Figs. 3 to 6. The lower pipe terminal 15 of the housing inlet fitting has the threaded nut 18, and the lower pipe terminal 17 of the housing outlet fitting has the threaded nut 19 (Figs. 1 and 2). Terminal 15 with the meter nut 18 and terminal 17 with meter nut 19 correspond to the usual so-called screw joint upper parts (comprising coupling nipple and meter nut). The threaded nuts 18 and 19, respectively, are connected to the corresponding screw joint lower parts 20 and 21 provided at the gas meter inlet and outlet terminals, respectively. The upper terminals 14 and 16 of the housing inlet and housing outlet fittings, respectively, have the threaded portions (screw joint lower parts) 22 and 23. The gas supply line 24 is connected by means of the screw joint upper part 36 comprising coupling nipple and meter nut to the threaded portion (screw joint lower part) 22 of the housing inlet fitting. The gas service line 25 is connected by means of the screw joint upper part 37 to the screw joint lower part 23 of the housing outlet fitting. In Fig. 3 the meter is shown connected to the gas supply and service lines 24 and 25. For insertion of the meter bar regulator in accordance with the invention, the screw joint upper parts 36, 37 are unscrewed and the meter bar regulator is placed between the meter pipes as shown in Fig. 4. The screw joint upper parts 18 and 19 are then screw-tightened on to the conventional portions 20 and 21 of the meter, while the screw joint upper parts 36 and 37 of the gas line are screwed to the screw joint lower parts 22, 23 of the regulator housing. The assembled unit is shown in Fig. 5 with a top elevation thereof shown in Fig. 6. From Figs. 3 to 6 the facility with which the regulator and meter may be assembled and disassembled is apparent.

When the meter and regulator are assembled in the manner shown in Figs. 5 and 6, the gas will enter through the supply pipe 24 into the meter through the side pipe 34 of the meter case, leave the meter through the side pipe 35 of the meter and the service pipe 25. Gas from the supply pipe 24 enters the upper portion of the housing inlet fitting 14 (Fig. 1) and the upper part of the housing limited by the upper shell 1 and the partition wall 3. The gas passes through the filter element 13 into the central portion of the regulator. Gas then flows through the throttle opening limited by the valve 12 in the valve seat 5 into the lower portion of the meter housing limited by the partition wall 3 and the lower shell 2. From the lower portion of the housing it flows out of the lower terminal of the housing inlet fitting 15 in through the connection 18, 20 through the side pipe 34 and through the gas meter. Gas flows out of the gas meter through the side pipe 35 through the fitting 21, 19 and through the housing outlet fitting through the service pipe 25. The pressure in the housing outlet fitting and therefore in the service pipe 25 will control the position of the operating diaphragm 9 by being communicated through the pipe 32. The position of the operating diaphragm 9 through the valve stem 11 will control the throttling opening defined between the valve 12 and the valve seat 5, which will determine the pressure of the flow entering the gas meter. The seal at the opening 6 will prevent gas from escaping from the upper portion of the housing separated by the partition wall 3, and the seal at the opening 4 will prevent the gas from passing from the upper portion of the housing through to the lower portion of the housing and out through the lower terminal 15 of the housing inlet fitting except through the throttle opening defined by the valve member 12 from the valve seat 5.

I claim:

1. Meter bar regulator for use in combination with a gas meter installation with vertically mounted installations line, comprising means defining a bipartite flattened elongated housing with an upper and a lower flat shell portion, a partition wall located between the said two housing portions and forming together with said portions a meter bar, vertical inlet and outlet pipe terminals coaxially arranged one above the other at one housing side, and separated from each other by said partition wall, the upper terminal being provided for the attachment of gas-supply line thereto, the lower terminal being provided for the attachment of the gas inlet opening of such a gas meter thereto, a second pair of pipe terminals being arranged in similar manner at the other side of the housing at a distance from said inlet and outlet pipe terminals corresponding to the normal spacing of the axis of gas-meter connection pipes, said second two pipe terminals being interconnected together by a conduit passing in a gas-tight manner through said partition wall, the upper of said second terminals defining a connection for attachment of the gas-service line thereto, and the lower a connection for attachment to the gas outlet opening of such a meter, an opening defined through said partition wall, an opening defined through the upper portion of the housing and an integral regulator unit removably inserted in said opening defined in the top of said housing in gas-tight connection therewith, said unit having a pressure-controlled throttle controlling fluid flow through said opening in said partition wall from the upper housing portion to the lower housing portion.

2. Meter bar regulator according to claim 1, including means defining a gas connection between said conduit interconnecting said second pipe terminals and the pressure-control space for regulating the throttle opening in said regulator unit.

3. Meter bar regulator according to claim 1 in which said pipe terminals define screw joints for removable attachment with said meter, gas surface line and gas supply line.

References Cited in the file of this patent

UNITED STATES PATENTS

| | | |
|---|---|---|
| 340,450 | Moore | Apr. 20, 1886 |
| 788,352 | Crawford | Apr. 25, 1905 |
| 930,640 | Youngs | Aug. 10, 1909 |
| 1,807,200 | Dennison | May 26, 1931 |
| 1,930,060 | Newman et al. | Oct. 10, 1933 |
| 2,003,828 | Ey | June 4, 1935 |
| 2,339,753 | Bloom | Jan. 25, 1944 |
| 2,615,470 | Bickley | Oct. 28, 1952 |
| 2,634,757 | Houghton | Apr. 14, 1953 |

FOREIGN PATENTS

| | | |
|---|---|---|
| 441,025 | France | May 17, 1912 |
| 288,845 | Great Britain | Apr. 2, 1928 |
| 477,003 | Great Britain | Dec. 20, 1937 |